US00RE37493B1

(19) United States
(12) Reissued Patent
Thomas

(10) Patent Number: US RE37,493 E
(45) Date of Reissued Patent: Jan. 1, 2002

(54) LOCALIZED AUTOMATIC FIRE EXTINGUISHING APPARATUS

(75) Inventor: Alan E. Thomas, 424 Atlantic Ave., Ocean City, NJ (US) 08226

(73) Assignees: Alan E. Thomas, Ocean City, NJ (US); Harry E. Stewart, Ft. Pierce, FL (US)

(21) Appl. No.: 09/137,960

(22) Filed: Aug. 20, 1998

Related U.S. Patent Documents

Reissue of:
(64) Patent No.: 5,548,276
Issued: Aug. 20, 1996
Appl. No.: 08/158,989
Filed: Nov. 30, 1993

(51) Int. Cl.[7] ..... G08B 17/12
(52) U.S. Cl. ..... 340/578; 169/61; 250/339.15; 250/342
(58) Field of Search ..... 340/578; 169/61; 250/342, 339.15

(56) References Cited

U.S. PATENT DOCUMENTS

| | | | | |
|---|---|---|---|---|
| 3,493,953 A | | 2/1970 | Taylor | 340/578 |
| 3,665,440 A | * | 5/1972 | McMenamin | 340/578 |
| 3,689,773 A | | 9/1972 | Wheeler | 340/578 |
| 3,739,365 A | * | 6/1973 | Müller | 340/578 |
| 3,824,392 A | | 7/1974 | Tibbling | 340/578 |
| 4,553,031 A | | 11/1985 | Cholin et al. | 250/339.15 |
| 4,671,362 A | * | 6/1987 | Odashima | 340/578 |
| 4,800,285 A | | 1/1989 | Akiba et al. | 340/578 |
| 4,909,329 A | | 3/1990 | Yoshida et al. | 169/61 |
| 5,107,128 A | | 4/1992 | Davall et al. | 340/578 |

* cited by examiner

*Primary Examiner*—Glen Swann
(74) *Attorney, Agent, or Firm*—Beyer Weaver & Thomas, LLP

(57) ABSTRACT

An automated fire extinguishing apparatus includes a turret with a nozzle connected to a water supply. A plurality of sensors are used to detect a fire monitored by the apparatus. The signals from the sensors are used to aim the nozzle toward the fire and to initiate water ejection therefrom. After the fire is extinguished the water is turned off.

56 Claims, 3 Drawing Sheets

LOCALIZED AUTOMATIC FIRE EXTINGUISHING APPARATUS

Matter enclosed in heavy brackets [ ] appears in the original patent but forms no part of this reissue specification; matter printed in italics indicates the additions made by reissue.

BACKGROUND OF THE INVENTION

1. Field of Invention

This invention pertains to an automatic fire extinguishing apparatus, and more particularly to an apparatus which locates a fire in a room and directs a stream of water or other agent from a nozzle at the fire for extinguishing it.

2. Description of the Prior Art

Automatic sprinkler installations are common in both residential and commercial establishments and are frequently mandated by local fire codes. However these sprinkler installations consist merely of a plurality of water nozzles set off by mechanical heat sensors. Because these types of heat sensors are slow and inefficient, by the time the fire is detected it has usually spread over a large area causing injuries and property damage before it is extinguished. Additionally, a fire is much more difficult to extinguish after it has spread then at its inception. Fire detectors are also known which detect a fire by using heat and/or light sensors. However these types of detectors are used commonly merely to set off fire alarms and not to extinguish the fire itself. U.S. Pat. Nos. 3,665,440; 3,493,953; 3,689,773 and 3,824,392 show various state of the art detectors.

OBJECTIVES AND SUMMARY OF THE INVENTION

In view of the above-mentioned disadvantages of the prior art, it is an objective of the present invention to provide an apparatus which can quickly identify and extinguish a fire before it has a chance to spread.

A further objective is to provide an apparatus which can accurately pinpoint and extinguish a fire whereby the fire extinguishing activity is, restricted only to the immediate vicinity of the fire thereby reducing damage.

A further objective is to provide a fire extinguishing apparatus which is reliable yet inexpensive.

Other objectives and advantages of this invention shall become apparent from the following description.

Briefly, the fire extinguishing apparatus constructed in accordance within invention contains a turret mounted to oversee a preselected area or room, and a plurality of sensors for sensing a fire. The apparatus also includes nozzle means disposed on the turret, and aiming means coupled to said sensors for aiming said nozzle means toward a fire detected by the sensors. An extinguishing agent is then ejected toward the fire by the nozzle means. After the fire has been extinguished, the flow of the extinguishing agent to the nozzle means is disrupted.

DETAILED DESCRIPTION OF THE INVENTION

Figure 1:
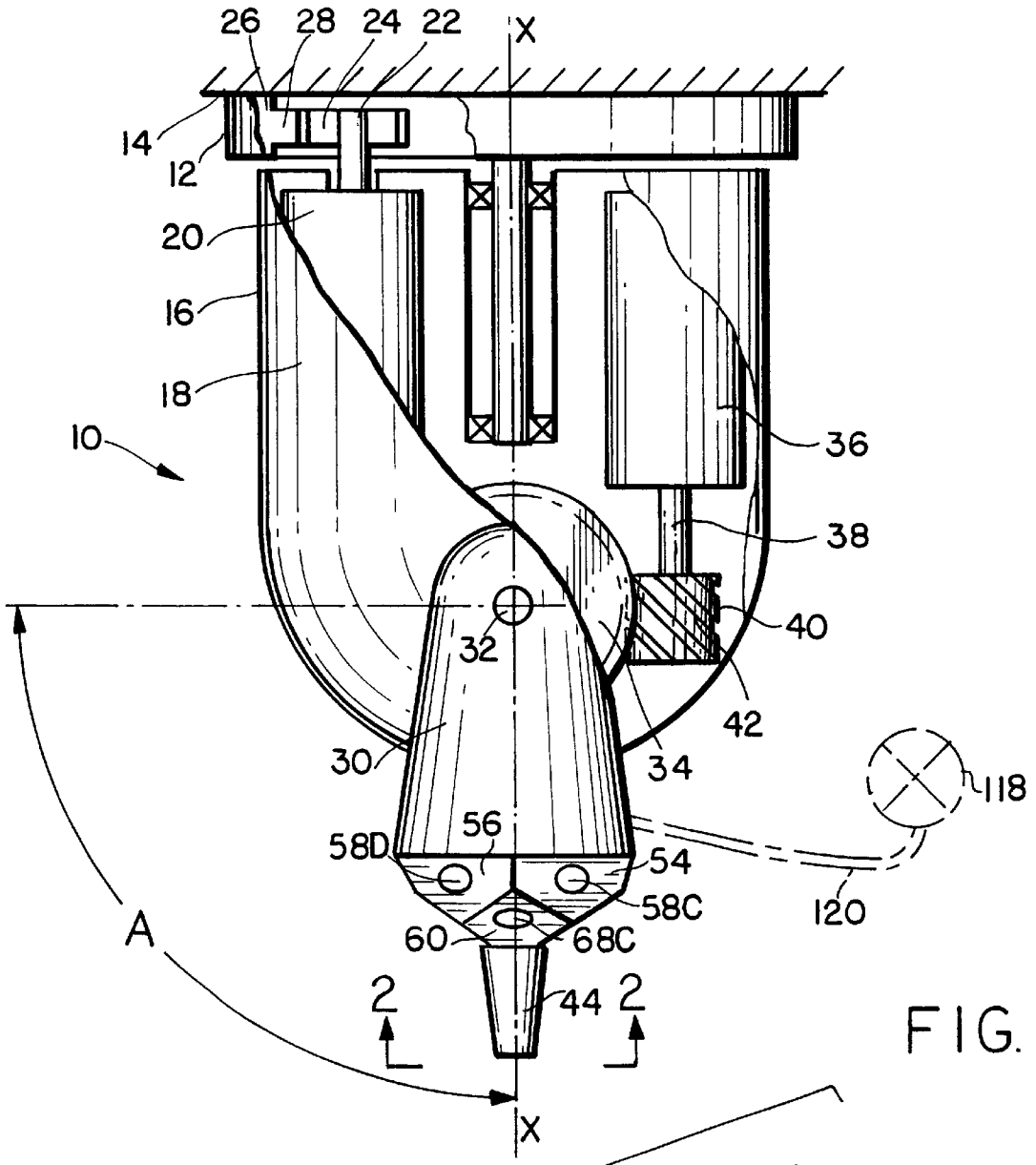
FIG. 1 shows a side elevational view of a fire extinguishing apparatus constructed in accordance with this invention.
Figure 2:
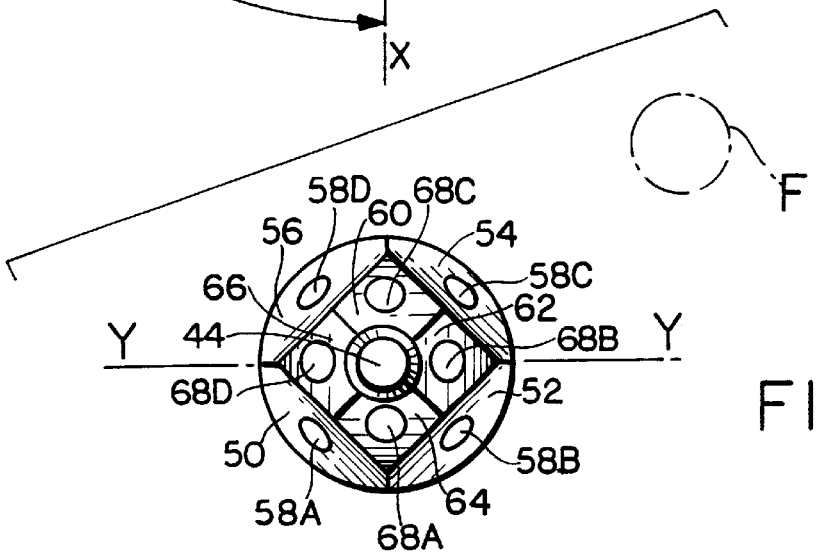
FIG. 2 shows a bottom view of the apparatus head showing the arrangement of the sensors and spray nozzle.

Referring now to the drawings, and more particularly FIGS. 1 and 2, an apparatus 10 constructed in accordance with this invention includes a base 12 mounted on a ceiling 14 and a turret 16. The turret 16 includes a generally cylindrical housing 18 open at the top. A motor 20 secured inside housing 18 is used to rotate the turret 16 about a vertical axis X—X. For this purpose, motor 20 has a shaft 22 terminating in a toothed gear 24. Base 12 is provided with a stationary ring 26 having radially inwardly extending teeth 28. Teeth 28 engage gear 24 so that as the shaft 22 is turned by motor 20, the turret 18 rotates with respect to the base.

An arm 30 is mounted on housing 18 by a horizontal shaft 32. Shaft 32 also supports a toothed gear 34 disposed inside housing 18. Also within housing 18 there is provided a second motor 36 with a shaft 38 and a gear 40. Importantly, gear 40 has teeth 42 disposed at an angle and engaging the toothed wheel 34 such that as the gear 40 is turned by motor 36, it causes gear 34 and arm 30 to turn about shaft 32.

At the tip of arm 30 there is provided a nozzle 44. Initially the arm 30 is positioned so that the nozzle 44 is pointed straight down as indicated in FIG. 1. This position of the nozzle is referred to as the initial or rest position. The gear 34 is arranged so that as the motor 36 rotates, the wheel 34 causes the arm 30 and nozzle 44 to turn about shaft 32 in a preselected direction. Thus, as motor 36 is activated, the nozzle 44 turns in a vertical plane Y—Y passing through the center of turret 16 as shown in FIG. 2.

As previously mentioned, turret 16 is rotatable in either direction by any arbitrary angle about a vertical axis X—X by motor 20. In this manner, nozzle 44 can he directed in any direction by rotating the housing 18 in a panning movement and then or simultaneously tilting the nozzle about shaft 32.

Arm 30 is formed with a plurality of flat surfaces which may be arranged in different patterns as required. For example, as shown in FIG. 1, the arm 30 may be provided with two set of surfaces. One set of four surfaces 50, 52, 54, 56 is disposed at an angle of about 20° with respect to a vertical plane and arranged around nozzle 44. Each of these surfaces 50–56 is provided with an infrared scan sensor 58. Radially inwardly of surfaces 50–56 there is provided a second set of surfaces 60, 62, 64, 66 disposed at about 70° with respect to a vertical plane. Each of the surfaces 60–66 is provided with a seek sensor 68 angularly offset from the scan sensors 58 by 45°. Sensors 66 and 58 thus form a two-dimensional array around nozzle 44 as seen in FIG. 2.

Figure 3:
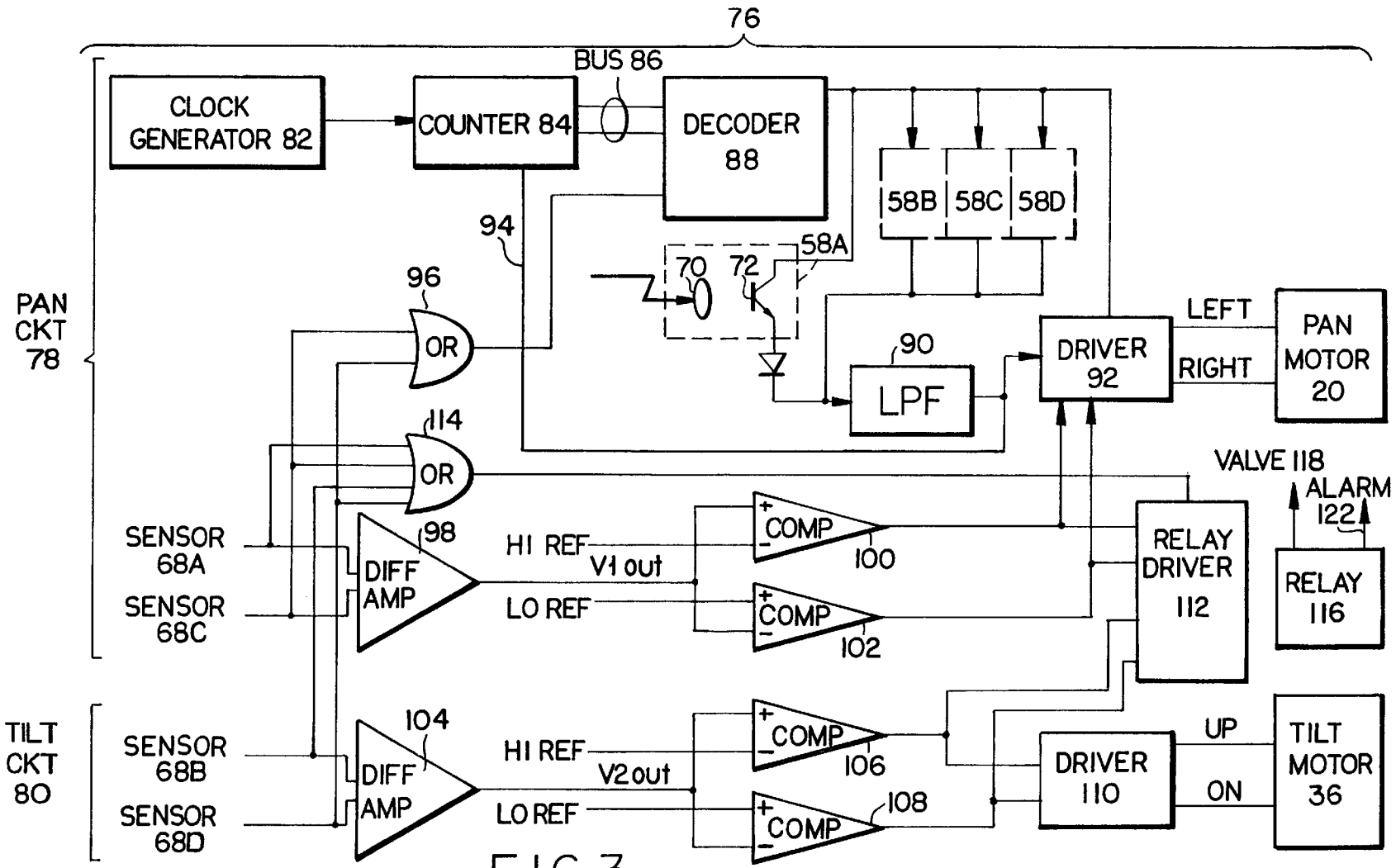
FIG. 3 shows a block diagram of one embodiment of the control circuit for the apparatus of FIGS. 1 and 2.
Figure 4:
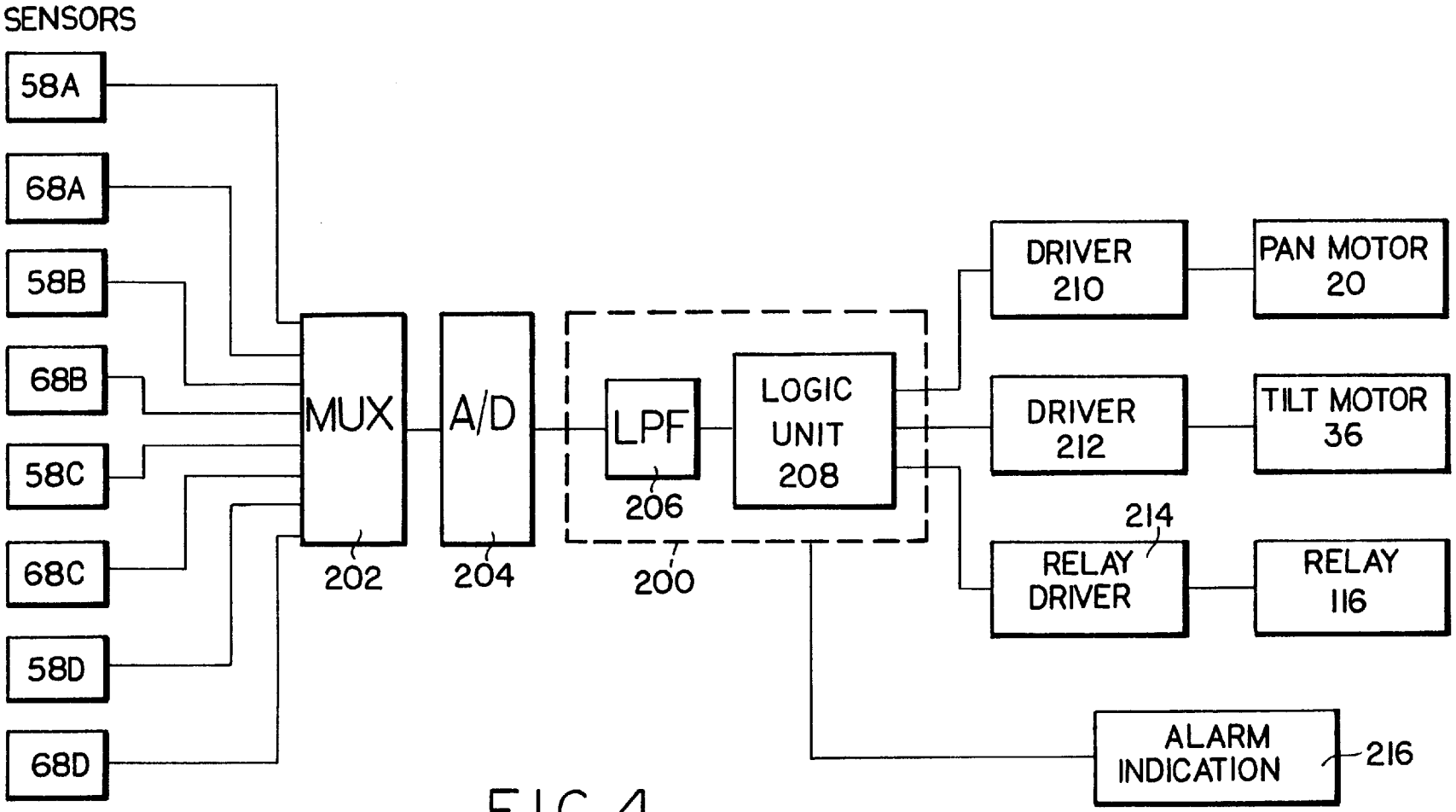
FIG. 4 shows a block diagram of an alternate embodiment of the control circuit.

The scan and seek sensors 58, 68 are each arranged and constructed to monitor a solid cone directed along an axis normal to the respective surfaces 50–56, 60–66 through the room or area being monitored by device 10. The sensors which may be either infrared photodetectors or pyroelectric ceramic sensors, generate electrical signals corresponding to the radiated energy sensed by the respective sensor in the solid cone. The scan and seek sensors are used to detect a fire in the room or area monitored by device 10 and to aim nozzle 44 through the motors 20 and 36 toward the fire. Details of the sensors 58, 68 and how they are interconnected is shown in FIGS. 3 and 4. As seen in FIG. 3, sensor 58A consist of an infrared filter 70 and an phototransistor 72. Light passing to phototransistor 72 is filtered by the infrared filter 70 to eliminate ambient light. Each of the other sensors 58B, 58C, 58D, 68A, 68B, 68C and 68D are formed of similar filters and phototransistors which have been omitted herein for the sake of clarity. Sensors 58A, 58B, 58C and 58D cooperate to monitor the room or area of device 10 and when a fire is detected to pan the turret 16 generally toward said fire. For this purpose, inside housing 18 an electronic circuit 76 is provided consisting of a pan circuit 78 and a tilt circuit 80. The pan circuit includes a clock generator 82 for generating clock signals at predetermined intervals. The clock signals are fed to a counter 84 which in response increments a count on a parallel bus 86. Preferably, the counter is set to count from 1 to N where N is the number of scan sensors 58 (in this case four). The bus 86 feeds the count to a decoder 88 which in response activates the scan sensors 58A, 58B, 58C and 58D one at a time in sequence. The output of each sensor 58A–58D is fed to a low pass filter 90. Low pass filter 90 is used to filter the signals from the sensors to eliminate false signals generated by hot objects within the field of the sensors. More particularly, it is known that the light intensity produced by fires is not constant but it flickers because of various physical parameters in a frequency range of about 5–30 Hz. Thus, low pass filter 90 is used to eliminate signals outside this range, such as for example a 60 Hz signal produced by a standard incandescent lamp.

The filtered signal from the filter 90 is fed to a driver 92 which is also connected to the decoder 88 so that the driver 92 can identify the sensor which has produced the signal received from the filter. Based on these received signals, driver 92 then drives the pan motor 20 either to the clockwise or counterclockwise as required to generally orient the housing 16 toward the fire. While the motor 20 is driven in response to a signal from one of the scan sensors, the counter is disabled through a line 94 also connected to the output of filter 90.

The seek sensors 68 provide signals similar to the sensors of the scan sensors. If necessary, these signals may also be filtered as described above.

The pan motor 20 continues moving the housing 16 until one of the seek sensors disposed in plane Y—Y (i.e. sensor 68B or 68D) also senses the fire. For this purpose, the output of sensors 68C and 68D are fed to an OR gate 96. When either of these sensors detects the fire, the signal output from sensor 96 disables the decoder 88, which in turn stops motor 20 through driver 92. At this point the seek sensors take over the operation of aiming the nozzle 44. Because of the panning motion of motor 20, the turret 16 has been rotated so that the fire is somewhere ahead of either sensor 68B or 68D. At this point, the nozzle 44 casts a shadow which occults the fire from one or two of the seek sensors 168. The turret 16 and arm 30 are now moved around by the four seek sensors 68 until this shadow is eliminated and hence the nozzle is aimed at the fire. For this purpose the outputs of sensors 68A and 68C are fed to a differential amplifier 98 which in response generates an analog signal having an amplitude proportional to the difference between these two sensor outputs. The output of amplifier 98 V1out is fed to two comparators 100, 102. Comparators 100, 102 determine if the amplifier output is outside a preselected range determined by two voltage signals HI REF and LO REF used as references signals by comparators 100 and 102 respectively. If the output V1out is above the preselected range, comparator 100 generates an output which is fed to driver 92 and used to drive motor 20 in one direction. If V1out is below said range, comparator 102 generates a signal which is fed to driver 92 to drive a motor 20 in the opposite direction. In this manner the pan motor 20 is used to align the nozzle quickly with one of the sensors 68A, 68C.

As can be seen from FIG. 3, a similar arrangement is used for the tilt circuit 80. For this circuit, the outputs of sensors 68B, 68D are fed to a differential amplifier 104. The output V2out of amplifier 104 is fed to two comparators 106, 108 for comparing this output to another preselected range. If V2out is above this range, comparator 106 activates a driver 110 which in response turns the tilt motor 36 in one direction. If the output V2out is below the preselected range, comparator 108 generates a signal for driver 110 for driving the tilt motor 36 in the opposite direction until the output of comparator 108 falls within the second preselected range.

In this manner the four seek sensors 68 cooperate to pan the housing 16 and tilt arm 30 until the nozzle is directed toward the fire. When the four seek sensors generate approximately equal outputs, i.e. none of them are occulted by the nozzle 44, the output of comparators 100–108 are the same. These four outputs are fed to a relay 112 driver. Relay driver also receives an input from an OR gate 114 to indicate that at least one of the sensors 68 A–D is high, i.e. a fire has actually been detected. When the signals to driver 112 indicate that a fire has been detected and that the nozzle 44 has been properly aimed, the driver 112 activates a relay 116. Relay 116 then opens a valve 118 (FIG. 1) for pumping water or another fire extinguishing agent into nozzle 44 through a hose 120.

The operation of the device is evident from the above-description. Suppose a fire breaks out in a zone F. The fire is first detected by scan sensor 58B. In response to an output from this sensor, the pan circuit 78 of FIG. 3 activates the pan motor 20 causing the turret 16 to turn counterclockwise until the fire comes into the view of seek sensor 68B. At this point the scan sensors 58 are disabled and the four seek sensors 68 take over. Sensors 68A, 68C continue the panning until the plane Y—Y of the housing is passing through zone F. At the same time, the sensors 68B, 68D tilt the nozzle upward until it is pointed at the fire zone F. Once the aiming of the nozzle is completed, the relay 116 activates valve 118 and an agent is directed by the nozzle at the fire zone F. Relay 116 also generates a fire alarm signal on alarm line 122. If the sensors no longer detect a fire, the relay 116 is disabled by driver 112 and valve 118 is closed.

Thereafter the device 10 is checked and serviced as required, the nozzle is re-oriented in the downward position, and the device is once again ready for operation.

In order to insure that the device operates properly, the scan sensors are arranged so that at least the field of vision of sensors 58A, 58B as well as sensors 58C and 58D overlap respectively to eliminate dead zones, i.e. zones in which a fire cannot be detected.

Of course the number of scan or seek sensors may be increase or decreased. Additionally, instead of the discrete circuitry shown in FIG. 3, a microprocessor based circuit may also be used, as shown in FIG. 4. In this Figure, the eight sensors 58A–D, 68A–D are scanned sequentially by a microprocessor 200 through a multiplexer 202 and an analog-to-digital converter 204. The sensor outputs may be filtered either by using analog filtering, or within the microprocessor, using a software implemented digital filter 206. This filtering is performed to separate signals due to a fire from other infrared sources as discussed above. A logic unit 208 monitors the sensor outputs. The fields of the sensors are overlapped so that a fire zone F is indicated by the respective output of three sensors. These outputs are used by the logic unit to determine the location of the fire zone and to pan the turret 16 toward the fire zone through a driver 210 and simultaneously to tilt the arm through a driver 212. After the nozzle has been aimed, the logic unit activates a driver 214 to energize relay 116. A fire alarm indication 216 is separately energized by logic unit 208.

Obviously numerous modifications may be made to this invention without departing from its scope as defined in the appended claims.

I claim:

1. A fire extinguishing apparatus comprising;

a turret mounted in a preselected area;

sensor means for detecting a fire;

nozzle means mounted on said turret, said nozzle means being arranged and constructed to eject a fire extinguishing agent; and aiming means coupled to said sensor for aiming said nozzle means toward said fire when said fire is detected by said sensor means;

wherein said sensor means includes a first set of sensors having optical axes disposed at a first angle with respect to a vertical line and a second set of axis disposed at a second angle with respect to said vertical line.

2. The extinguisher of claim 1 wherein said turret is rotatable.

3. The apparatus of claim 2 wherein said aiming means includes means for rotating said turret about a vertical axis.

4. The apparatus of claim 3 wherein said nozzle means is rotatable with respect to a horizontal axis.

5. The apparatus of claim 1 wherein said first set of sensors alternate with respect to said second said of sensors.

6. The apparatus of claim 1 wherein said sensor means is mounted on said turret for concurrent movement with said nozzle means.

7. A fire extinguishing apparatus comprising;

a housing rotatable about a first axis;

a nozzle supported by said housing;

sensor means for sensing a fire;

aiming means for aiming said nozzle toward said fire; and water supply means coupled to said sensor means for supplying water to said nozzle when said fire is sensed;

wherein said sensor means comprises a plurality of sensors arranged in an array around said nozzle.

8. The apparatus of claim 7 wherein said nozzle is rotatable about a second axis normal to said first axis.

9. The apparatus of claim 7 wherein said sensor means is mounted on said housing and is coupled to said nozzle for concurrent movement therewith.

10. The apparatus of claim 7 wherein said nozzle is constructed and arranged to occult said fire from some of said sensors when said nozzle is not aimed toward said fire.

11. The apparatus of claim 7 wherein each of said sensors comprises an electrical element, and a field of vision, said electrical element generating an electrical signal when said fire is in the field of vision of the corresponding sensor.

12. The apparatus of claim 11 further comprising filtering means for filtering a frequency of said electrical signals to differentiate said fire from other heat sources.

13. A fire extinguishing apparatus comprising:

a housing disposed in a preselected area;

nozzle means for selectively directing water at a fire;

a plurality of sensor means mounted on the nozzle means, each said sensor monitoring a portion of said area to generate a sensor signal when a fire is detected; and aiming means coupled to each said sensor means for aiming said nozzle toward said fire.

14. The apparatus of claim 13 wherein said housing is rotatable about a vertical axis and said nozzle is mounted on said housing.

15. The apparatus of claim 14 wherein said nozzle means is rotatable about a horizontal axis.

16. The apparatus of claim 15 wherein said nozzle means and said sensors are mounted on an arm.

17. The apparatus of claim 16 wherein said aiming means includes a pan motor for panning said housing about said vertical axis in response to signals from said sensors.

18. The apparatus of claim 17 further comprising a tilting motor for tilting said nozzle means with respect to said horizontal axis in response to signals from said sensors.

*19. A fire extinguishing apparatus comprising;*

*a housing rotatable about a first axis;*

*a nozzle supported by said housing;*

*a plurality of sensors arranged in an array around said nozzle, said sensors being used to sense a fire;*

*a nozzle aiming unit that aims said nozzle toward said fire; and*

*a fire extinguishing agent supply unit that supplies fire extinguishing agent to said nozzle when said fire is sensed.*

*20. The apparatus of claim 19 wherein said nozzle is rotatable about a second axis normal to said first axis.*

*21. The apparatus of claim 19 wherein said sensors are coupled to said nozzle for concurrent movement therewith.*

*22. The apparatus of claim 19 wherein said nozzle is constructed and arranged to occult said fire from some of said sensors when said nozzle is not aimed toward said fire.*

*23. The apparatus of claim 19 wherein each of said sensors comprises an electrical element with a field of vision, said electrical element generating an electrical signal when said fire is in the field of vision of the corresponding sensor.*

*24. The apparatus of claim 23 further comprising a filter that filters a frequency of said electrical signals to differentiate said fire from other heat sources.*

*25. The apparatus of claim 19 wherein said fire extinguishing agent supply unit stops the supply of said fire extinguishing agent to said nozzle when said fire is no longer sensed by said sensors.*

*26. The apparatus of claim 25 wherein said sensors are coupled to said nozzle for concurrent movement therewith.*

*27. The apparatus of claim 26 wherein said nozzle is constructed and arranged to occult said fire from some of said sensors when said nozzle is not aimed toward said fire.*

*28. The apparatus of claim 25 wherein said nozzle is constructed and arranged to occult said fire from some of said sensors when said nozzle is not aimed toward said fire.*

*29. The apparatus of claim 19 wherein said nozzle aiming unit aims said nozzle towards said fire based on signals from said sensors.*

*30. The apparatus of claim 29 wherein said fire extinguishing agent supply unit stops the supply of said fire extinguishing agent to said nozzle when said fire is no longer sensed by said sensors.*

*31. A fire extinguishing apparatus comprising:*

*a housing disposed in a preselected area;*

*a nozzle that selectively directs fire extinguishing agent at a fire;*

*a plurality of sensors mounted on the nozzle, each said sensor monitoring a portion of said area to generate a sensor signal when a fire is detected; and*

*a nozzle aiming unit that aims said nozzle toward said fire.*

*32. The apparatus of claim 31 wherein said housing is rotatable about a vertical axis and said nozzle is mounted on said housing.*

*33. The apparatus of claim 32 wherein said nozzle is rotatable about a horizontal axis.*

*34. The apparatus of claim 33 wherein said nozzle and said sensors are mounted on an arm.*

*35. The apparatus of claim 34 wherein said nozzle aiming unit includes a pan motor for panning said housing about said vertical axis in response to signals from said sensors.*

*36. The apparatus of claim 35 further comprising a tilting motor for tilting said nozzle with respect to said horizontal axis in response to signals from said sensors.*

*37. The apparatus of claim 31 wherein said nozzle aiming unit aims said nozzle towards said fire based on signals from said sensors.*

*38. The apparatus of claim 37 wherein said nozzle aiming unit determines that said nozzle is properly aimed at said fire by balancing the signals received from at least one opposing pairs of the sensors.*

*39. A method for directing a nozzle of a fire extinguishing apparatus towards a fire, said method comprising the acts of:*

*(a) monitoring infrared energy within a predetermined area;*

*(b) filtering out the infrared energy not within a predetermined frequency range to produce filtered energy signals;*

*(c) determining existence of a fire within the predetermined area based on the filtered energy signals;*

*(d) determining a location of the fire within the predetermined area when said determining (c) determines the existence of the fire; and*

*(e) directing a nozzle of a fire extinguishing apparatus to the location of the fire,*

*wherein said determining (d) of the location of the fire and said directing (e) of the nozzle to the location of the fire are performed simultaneously.*

*40. A method as recited in claim 39, wherein said monitoring (a) monitors a plurality of infrared sensors.*

*41. A method as recited in claim 39, wherein the predetermined frequency range is from* 5–10 Hz.

*42. A method for directing a nozzle of a fire extinguishing apparatus towards a fire, said method comprising the acts of:*

*(a) monitoring infrared energy within a predetermined area;*

*(b) filtering out the infrared energy not within a predetermined frequency range to produce filtered energy signals;*

*(c) determining existence of a fire within the predetermined area based on the filtered energy signals;*

*(d) determining a location of the fire within the predetermined area when said determining (c) determines the existence of the fire; and*

*(e) directing a nozzle of a fire extinguishing apparatus to the location of the fire;*

*wherein the fire extinguishing apparatus includes a plurality of sensors positioned around the nozzle, and the sensors detect the infrared energy.*

*43. A method as recited in claim 42, wherein said determining (d) of the location of the fire finds the location of the fire by balancing the infrared energy received from the sensors.*

*44. A method as recited in claim 42, wherein said determining (d) of the location of the fire and said directing (e) of the nozzle to the location of the fire are performed simultaneously.*

*45. A method for extinguishing a detected fire, said method comprising the acts of:*

*(a) monitoring infrared energy within a predetermined area;*

*(b) filtering out the infrared energy not within a predetermined frequency range to produce filtered energy signals;*

*(c) determining existence of a fire within the predetermined area based on the filtered energy signals;*

*(d) determining a location of the fire within the predetermined area when said determining (c) determines the existence of the fire;*

*(e) directing a nozzle of a fire extinguishing apparatus to the location of the fire;*

*(f) supplying fire extinguishing agent through said nozzle when said fire is sensed; and*

*(g) ceasing the supply of the fire extinguishing agent through said nozzle when said fire is no longer sensed by said sensors.*

*46. A method as recited in claim 45, wherein following said ceasing (g), said method is again ready to locate another fire by repeating said acts (a) through (g).*

*47. A method as recited in claim 45, wherein said monitoring (a) monitors a plurality of infrared sensors.*

*48. A method as recited in claim 45, wherein the predetermined frequency range is from* 5–10 Hz.

*49. A method as recited in claim 45,*

*wherein the fire extinguishing apparatus includes a plurality of sensors positioned around the nozzle, and the sensors detect the infrared energy, and*

*wherein said determining (d) of the location of the fire finds the location of the fire by balancing the infrared energy received from the sensors.*

*50. A method as recited in claim 45, wherein said determining (d) of the location of the fire and said directing (e) of the nozzle to the location of the fire are performed simultaneously.*

*51. A method for extinguishing a detected fire, said method comprising the acts of:*

*(a) monitoring infrared energy within a predetermined area;*

*(b) filtering out the infrared energy not within a predetermined frequency range to produce filtered energy signals;*

*(c) determining existence of a fire within the predetermined area based on the filtered energy signals;*

*(d) determining a location of the fire within the predetermined area when said determining (c) determines the existence of the fire;*

*(e) directing a nozzle of a fire extinguishing apparatus to the location of the fire; and*

*(f) supplying fire extinguishing agent through said nozzle when said fire is sensed, wherein the fire extinguishing apparatus includes a plurality of sensors positioned around the nozzle, and the sensors detect the infrared energy, and*

*wherein said determining (d) of the location of the fire finds the location of the fire by balancing the infrared energy received from the sensors.*

*52. A method for extinguishing a detected fire, said method comprising the acts of:*

*(a) monitoring infrared energy within a predetermined area;*

*(b) filtering out the infrared energy not within a predetermined frequency range to produce filtered energy signals;*

(*c*) *determining existence of a fire within the predetermined area based on the filtered energy signals;*

(*d*) *determining a location of the fire within the predetermined area when said determining* (*c*) *determines the existence of the fire;*

(*e*) *directing a nozzle of a fire extinguishing apparatus to the location of the fire; and*

(*f*) *supplying fire extinguishing agent through said nozzle when said fire is sensed,*

*wherein said determining* (*d*) *of the location of the fire and said directing* (*e*) *of the nozzle to the location of the fire are performed simultaneously.*

*53. An apparatus for detecting a location of a fire within a predetermined area, said apparatus comprising:*

*means for monitoring infrared energy within the predetermined area;*

*means for filtering out the infrared energy not within a predetermined frequency range to produce filtered energy signals;*

*means for determining existence of a fire within the predetermined area based on the filtered energy signals;*

*means for determining a location of the fire within the predetermined area when said means for determining determines the existence of the fire;*

*means for directing a nozzle of a fire extinguishing apparatus to the location of the fire;*

*means for supplying fire extinguishing agent through said nozzle when said fire is sensed; and*

*means for ceasing the supply of the fire extinguishing agent through said nozzle when said fire is no longer sensed by said sensors.*

*54. An apparatus as recited in claim 53, wherein said means for determining the location of the fire is performed using the filtered energy signals.*

*55. An apparatus as recited in claim 54, wherein said apparatus further comprises;*

*means for directing a nozzle of a fire extinguishing apparatus to the location of the fire.*

*56. An apparatus as recited in claim 55, wherein the determining of the location of the fire by said means for determining and the directing of the nozzle to the location of the fire by said means for directing are performed simultaneously.*

* * * * *

UNITED STATES PATENT AND TRADEMARK OFFICE

CERTIFICATE OF CORRECTION

PATENT NO. : RE 37,493 E
DATED : January 1, 2002
INVENTOR(S) : Alan E. Thomas

It is certified that error appears in the above-identified patent and that said Letters Patent is hereby corrected as shown below:

Column 1,
Line 8, insert -- Notice: More than one reissue application has been filed for the reissue of patent 5,548,276. The reissue applications are 09/137,960 and 10/050,887. --.

Signed and Sealed this

Twenty-fifth Day of October, 2005

JON W. DUDAS
*Director of the United States Patent and Trademark Office*